United States Patent
Mueller

[11] Patent Number: 6,112,951
[45] Date of Patent: *Sep. 5, 2000

[54] ONE-PIECE DISPENSING SYSTEM AND METHOD FOR MAKING SAME

[75] Inventor: Bruce M. Mueller, Brookfield, Wis.

[73] Assignee: AptarGroup, Inc., Crystal Lake, Ill.

[*] Notice: This patent is subject to a terminal disclaimer.

[21] Appl. No.: 09/232,437

[22] Filed: Jan. 15, 1999

Related U.S. Application Data

[63] Continuation of application No. 08/680,251, Jul. 11, 1996, Pat. No. 5,927,566.

[51] Int. Cl.$^7$ .................................................. B65D 37/00
[52] U.S. Cl. .............................................. 222/490; 222/494
[58] Field of Search ........................... 222/212, 490, 222/491, 494

[56] References Cited

U.S. PATENT DOCUMENTS

| | | | |
|---|---|---|---|
| 1,739,871 | 12/1929 | Smith . | |
| 1,825,553 | 9/1931 | Smith . | |
| 1,989,714 | 2/1935 | Statham | 221/60 |
| 2,147,164 | 2/1939 | Kent | 221/60 |
| 2,904,225 | 9/1959 | Earles, Jr. | 222/183 |
| 3,349,972 | 10/1967 | Whiteford | 222/212 |
| 3,356,263 | 12/1967 | Monroe | 222/107 |
| 3,669,323 | 6/1972 | Harker et al. | 222/490 |
| 4,728,006 | 3/1988 | Drobish et al. | 222/181 |
| 4,749,108 | 6/1988 | Dornsbusch et al. | 222/212 |
| 4,772,614 | 9/1988 | Boynton | 383/5 |
| 4,969,581 | 11/1990 | Seifert et al. | 222/212 |
| 5,008,066 | 4/1991 | Mueller | 264/537 |
| 5,033,655 | 7/1991 | Brown | 222/212 |
| 5,071,017 | 12/1991 | Stull | 215/260 |
| 5,115,950 | 5/1992 | Rohr | 222/494 |
| 5,213,236 | 5/1993 | Brown | 222/185 |
| 5,271,531 | 12/1993 | Rohr | 222/212 |
| 5,370,834 | 12/1994 | Sorensen | 264/230 |
| 5,390,805 | 2/1995 | Bilnani et al. | 215/260 |
| 5,409,144 | 4/1995 | Brown et al. | 222/185 |
| 5,439,124 | 8/1995 | Mock | 215/40 |
| 5,439,143 | 8/1995 | Brown | 222/185 |
| 5,447,673 | 9/1995 | Belvederi | 264/238 |

(List continued on next page.)

FOREIGN PATENT DOCUMENTS

| | | |
|---|---|---|
| 0 160 336 | 11/1985 | European Pat. Off. . |
| 174029 | 3/1986 | European Pat. Off. . |
| 082757 | 8/1986 | European Pat. Off. . |
| 079676 | 12/1986 | European Pat. Off. . |
| 111798 | 7/1988 | European Pat. Off. . |
| 0 395 380 A2 | 10/1990 | European Pat. Off. . |
| 0 442 379 | 8/1991 | European Pat. Off. . |
| 554181 | 8/1993 | European Pat. Off. . |
| 405472 | 9/1993 | European Pat. Off. . |
| 0 570 276 | 11/1993 | European Pat. Off. . |

(List continued on next page.)

OTHER PUBLICATIONS

"Multi–Material Injection Saves Time, While Cutting Costs," Modern Plastics, Mar. 19, 1994 (Author: Peter Mapleston).

"Molding Many Parts Into One," Product Design and Development, Dec. 19, 1995, p. 16 (Author: Jay Rosenberg).

"Thermoplastic Elastomers," *Modern Plastics*, Mid–Nov. 1995, pp. B–56 to B–58 (Author: Charles P. Radar).

European Patent Office Search Report RS 97946 Standard Recherchenbericht (Jan. 28, 1997).

European Patent Office Search Report RS 97946 Standard Recherchenbericht (Feb. 10, 1997).

*Primary Examiner*—Joseph A. Kaufman
*Attorney, Agent, or Firm*—Rockey, Milnamow & Katz, Ltd.

[57] ABSTRACT

A dispensing system for a container is provided in the form of a dispensing end structure defining a dispensing orifice and a surrounding attachment region. Subsequently, a dispensing valve is molded from a second material to include (a) a peripheral portion molded against, and bonded to, the end structure attachment region, and (b) a central portion that extends from the peripheral portion across the dispensing orifice.

10 Claims, 4 Drawing Sheets

U.S. PATENT DOCUMENTS

| | | | |
|---|---|---|---|
| 5,472,122 | 12/1995 | Appleby | 222/212 |
| 5,531,363 | 7/1996 | Gross | 222/494 |
| 5,632,420 | 5/1997 | Lohrman et al. | 222/490 |
| 5,743,443 | 4/1998 | Hins | 222/490 |

FOREIGN PATENT DOCUMENTS

| | | |
|---|---|---|
| 586778 | 3/1994 | European Pat. Off. . |
| 591601 | 4/1994 | European Pat. Off. . |
| 624525 | 11/1994 | European Pat. Off. . |
| 624526 | 11/1994 | European Pat. Off. . |
| 497961 | 12/1994 | European Pat. Off. . |
| 0 649 795 A2 | 4/1995 | European Pat. Off. . |
| 555623 | 11/1995 | European Pat. Off. . |
| 0 713 832 | 5/1996 | European Pat. Off. . |
| 734960 | 10/1996 | European Pat. Off. . |
| 0 841 258 A2 | 5/1998 | European Pat. Off. . |
| 673584 | 1/1930 | France . |
| 2284533 | 4/1976 | France . |
| 2661127 | 10/1991 | France . |
| 2 729 925 | 2/1995 | France . |
| 2341935 | 3/1975 | Germany . |
| 2341936 | 3/1975 | Germany . |
| 2341934 | 2/1983 | Germany . |
| 3347079 | 7/1985 | Germany . |
| 9307983 | 5/1993 | Germany . |
| 4403082 | 4/1995 | Germany . |
| 29 508 151 | 8/1995 | Germany . |
| 4403080 | 8/1995 | Germany . |
| 4403081 | 8/1995 | Germany . |
| 19510007 | 10/1995 | Germany . |
| 4417569 | 11/1995 | Germany . |
| 4440211 | 2/1996 | Germany . |
| 19613130 | 3/1997 | Germany . |
| 273469 | 4/1982 | Spain . |
| 274526 | 4/1982 | Spain . |
| 286370 | 10/1984 | Spain . |
| 291588 | 1/1986 | Spain . |
| 1028503 | 7/1994 | Spain . |
| 1046518 | 10/1966 | United Kingdom . |
| 91/12951 | 9/1991 | WIPO . |
| 92/18318 | 10/1992 | WIPO . |
| WO 95/28274 | 10/1995 | WIPO . |
| 95/29806 | 11/1995 | WIPO . |
| 95/34500 | 12/1995 | WIPO . |
| WO 96/24483 | 8/1996 | WIPO . |
| WO 97/08979 | 3/1997 | WIPO . |

ONE-PIECE DISPENSING SYSTEM AND METHOD FOR MAKING SAME

This is a continuation of U.S. patent application Ser. No. 08/680,251, filed Jul. 11, 1996 now U.S. Pat. No. 5,927,556.

TECHNICAL FIELD

This invention relates to a system for dispensing a product from a container. The invention is more particularly related to a system incorporating a dispensing valve which is especially suitable for use with a squeeze-type container wherein a product can be discharged from the container through the valve when the container is squeezed.

BACKGROUND OF THE INVENTION AND TECHNICAL PROBLEMS POSED BY THE PRIOR ART

A variety of packages, including dispensing packages or containers, have been developed for personal care products such as shampoo, lotions, etc., as well as for other materials. Such containers typically have a neck defining an open upper end on which is mounted a dispensing closure. One type of dispensing closure for these kinds of containers typically has a flexible, pressure-openable, self-sealing, slit-type dispensing valve mounted in the closure over the container opening. When the container is squeezed, the valve slits open, and the fluid contents of the container are discharged through the open slits of the valve. The valve automatically closes to shut off fluid flow therethrough upon removal of the increased pressure.

Designs of closures using such valves are illustrated in the U.S. Pat. Nos. 5,271,531 and 5,033,655. Typically, the closure includes a body mounted on the container neck to hold the valve over the container opening.

A lid can be provided for covering the valve during shipping and when the container is otherwise not in use. See, for example, FIGS. 31–34 of U.S. Pat. No. 5,271,531. Such a lid can be designed to prevent leakage from the valve under certain conditions. The lid can also keep the valve clean and/or protect the valve from damage.

A dispensing closure incorporating such a pressure-openable valve provides advantages not found in other types of dispensing closures. For example, another common type of dispensing closure has a base defining a dispensing orifice which is normally occluded by a closed lid having a plug which enters into, and seals, the orifice. The lid must be lifted open to permit the product to be dispensed through the closure orifice. The lid must be manually closed after dispensing the product in order to permit the container to be carried or moved in any position other than a non-vertical position. Further, the lid must be closed in order to minimize evaporation or drying out of the product within the container. Also, the lid must be closed in order to prevent contaminant ingress.

Other types of dispensing closures include lift-up spouts or rotatable valve members. These features must be manipulated by the user when it is desired to open a dispensing passage and must be manipulated by the user when it is desired to close the dispensing passage.

With the above-discussed conventional types of dispensing closures that do not incorporate a pressure-openable valve, it may be possible to store the container with the closure thereon in an inverted position (with the dispensing closure at the bottom) so as to maintain the container product near the dispensing passage or orifice. This may be advantageous when the product is a rather viscous liquid because, when the inverted dispensing closure is opened, the product is already located at the dispensing passage or orifice and the dispensing time is minimized.

However, while the inverted storage of such a dispensing closure and container may speed dispensing of a viscous product, this can result in creating a rather messy condition at or around the dispensing closure passage or orifice. For example, with conventional dispensing closures that have a lid plug sealingly occluding a dispensing orifice in a closure base, inverted storage causes the inner end of the lid plug to be coated with the product. When the lid is opened, the product on the end of the plug is carried with the plug along the surface of the orifice. Some of the product sticks to the surface of the orifice and/or adjacent exterior edges of the closure base around the orifice. Some of the product also sticks to the lid plug. When the lid is subsequently closed after dispensing the product, the product on the lid plug and around the closure base orifice can create a messy condition around the exterior edge of the dispensing orifice. With the dispensing closure in the closed condition, the product around the exterior of the dispensing orifice can dry out and become somewhat hardened or encrusted during a subsequent period of non-use. This is not only aesthetically unpleasant, but it can inhibit the easy opening of the lid during subsequent use.

A pressure-openable dispensing valve advantageously eliminates or minimizes some of the above-discussed problems. Because such a valve does not have to be directly manipulated to effect its opening or closing, the user merely needs to squeeze the container to effect dispensing of the container product. Although such a simple squeezing action is generally required for dispensing a product, especially a viscous product, through any type of dispensing closure, the use of a pressure-openable valve in a dispensing closure eliminates the need to also initially, manually manipulate the valve, spout, or lid employed with other types of conventional closures.

Because a closure with a pressure-openable dispensing valve remains closed unless the container is squeezed, the closure and container can be inverted for storage (with the dispensing closure and valve at the bottom). Product does not leak through such a valve, and there is little or no mess on the exterior of the valve or surrounding closure surfaces.

Further, the use of a pressure-openable valve permits more accurate control of the dispensing process. Because the pressure-openable valve typically has a relatively thin membrane in which the dispensing slots are defined, there is no long orifice or passage through which the product must pass prior to discharge from the dispensing closure. Thus, the product discharges from the dispensing closure through such a pressure-openable valve relatively quickly and in substantially direct response to squeezing forces applied to the container which are readily sensed by the user as the user squeezes the container. The user has a more accurate "feel" of the relationship between the container squeezing force and the discharging product as the user squeezes the container.

Further, because the pressure-openable valve membrane defining the dispensing aperture slits is relatively thin, and because the valve can be positioned in the dispensing closure at, or very near, the most exterior surface of the closure, the user can readily observe the valve and its dispensing slits. Thus, the user can easily see the product being discharged, and the user can more readily determine how hard to squeeze the container and when to terminate the squeezing of the container.

While dispensing closures with pressure-openable dispensing valves function generally satisfactorily in applications for which they are designed, it would be desirable to provide an improved dispensing system incorporating such pressure-openable valves. For example, in conventional dispensing closures incorporating such pressure-openable valves, special retention systems are required to hold the valves within the closures. In particular, a pressure-openable valve typically is retained in the closure base by means of a separate retainer ring which is snap-fit into the closure base over a flange of the valve. Thus, at least three separate components are typically required in such a conventional dispensing closure: the closure base (which may or may not include an auxiliary, hinged lid), the pressure-openable valve, and the retainer ring.

Such snap-fit rings are small and somewhat flexible. Because the pressure-openable valve and the retainer ring are both relatively small, it is difficult to provide a design which facilitates component assembly and proper snap-fit retention. Careful control of dimensional tolerances is required in order to insure that the components can be properly assembled and in order to insure proper engagement of the snap-fit retention features.

During the manufacture of such a dispensing closure, processes must be employed to handle (1) the relatively small, and very flexible, pressure-openable valve, (2) the small, snap-fit retainer ring, and (3) the closure base. The processes include the following: the manufacture of the three components, the storage of the three components, the processing of the three components (including quality control inspections and material handling (including conveying)), and the assembly of the components. These processes are all susceptible to problems. For example, the components can be inadvertently damaged during the manufacturing operations. The components can also be inadvertently misaligned during assembly (e.g., resulting in an ineffective, or loose, snap-fit retention of the valve within the closure base).

Thus, the manufacturing processes—involving separate molding of the various components, inspection, handling, and assembly—must be undertaken with great care which is difficult and expensive to provide. Notwithstanding the exercise of a high degree of care in the manufacturing processes, such processes remain a potential source of trouble and can occasionally result in the manufacture of a defective assembly.

Further, the multi-component dispensing closure employing a pressure-openable valve is prone to failure after manufacture when subjected to intentionally or inadvertently applied high impact loads. For example, when a completed closure is shipped to a packager for mounting on a filled container, the packager typically handles the closure with automatic equipment. A portion of the closure may be snagged by such equipment, or the closure may be pushed with excessive force against another object. These actions may lead to a loosening or separation of the closure assembly components prior to, or during, the mounting of the closure on the filled container. This can create problems in the packager's automated filling line and lead to spills and/or shutdowns of the line while the problem is corrected.

In addition, when the completed package (comprising the filled container and dispensing closure mounted thereon) is put into the distribution channels by the packager, accidental or intentional loads imposed on the closure may cause a failure of a part of the closure. If the package is subjected to excessive impact forces during shipping and/or while being stored and/or displayed, then damage (e.g., loosening) of the closure components may occur.

Also, the fact that the conventional closure includes an assembly of the three components (closure base, valve, and retention ring) makes it easier for someone to tamper with the closure by partially or completely separating the closure components. Accordingly, it would be desirable to provide an improved dispensing system which would eliminate, or at least minimize, the problems associated with multi-component dispensing closures.

In addition, in some applications, it would be desirable to provide an even more secure dispensing system which could altogether eliminate a separate dispensing closure. Because a dispensing closure must be mounted on a container, automatic processing systems are typically employed to convey the container, fill the container with product, convey the closure, and apply the closure to the filled container. Costs are necessarily associated with the manufacture, handling, and assembly of the closure. Further, the use of a separate closure provides the opportunity for accidental misapplication of the closure to the container by the packager during the container filling and capping operation. This can result in an improperly assembled package which may cause problems in the filling line and which may leak in the filling line or subsequently during shipping and storage. A misapplied closure may become loose and fall away from the container during shipping and storage. If the closure remains on the container, but does not properly seal the container, the product within the container may become contaminated or spoiled.

Even when a package comprises a properly assembled and sealed container and closure, such a package still presents a potential problem. Specifically, consider the situation when the consumer has used up all of the product from the container. Instead of disposing of the empty container, the consumer may remove the closure and then refill the container with another product which may be the same as the original product or which may be different. Refilling of the container with the same product potentially diminishes sales of the original packager.

On the other hand, when the container is refilled with a different product, there is a danger that the user, or subsequent user, may not realize that the re-filled product is different from the product described on the container label. Use of the re-filled product by someone thinking that it is the original product described on the container label could result in property damage or personal injury.

Additionally, the relative ease of the removability of some types of closures from containers accommodates "black market" operations. In such operations, a black marketer salvages used, empty packages (comprising a container and dispensing closure) and re-fills the container with a product that may be similar to, but not the same as, the original product described on the container label. The re-filled package is then returned to the retail distribution chain. This can result in consumer dissatisfaction wherein the next consumer purchases the package assuming that it contains the original product described on the container label, but the different, re-filled product does not perform to the consumer's satisfaction. Use of the refilled product under such circumstances may also result in property damage, personal injury, and/or the tarnishment of the reputation of the original packager or marketer. Accordingly, it would be desirable to provide an improved dispensing system in which access to the container interior cannot be readily obtained.

It would also be desirable to provide an improved dispensing system for a package which would reduce the number of separate components needed to produce a completed package. Providing an improved dispensing system for a container that eliminates the need for a separate closure would discourage product refilling by an individual consumer as well as by organized black marketers. This would provide increased product security as well as minimize the potential for property damage or personal injury compared to packages which employ separate closures.

It would also be beneficial if such an improved dispensing system could accommodate the use of a variety of different materials. Further, it would be desirable if such an improved dispensing system could be provided with a design that would accommodate efficient, high quality, large volume manufacturing techniques with a reduced product reject rate.

The present invention provides an improved dispensing system which can accommodate designs having the above-discussed benefits and features.

SUMMARY OF THE INVENTION

According to one aspect of the present invention, a dispensing system is provided for a container. The dispensing system includes a dispensing end structure molded from a first material to define a dispensing orifice and a surrounding attachment region. An optional lid may be provided. The system also includes a dispensing valve which is subsequently from a second material. The valve includes (1) a peripheral portion molded against, and bonded to, the end structure attachment region, and (2) a central portion extending from the peripheral portion across the dispensing orifice. The dispensing system functions as a one-piece component and may be incorporated directly as a unitary part of a container body or may be provided as a closure per se for a container.

In one preferred form, the dispensing end structure is an injection-molded closure body to which the valve can be molded and which has an annular skirt that can be releasably or permanently attached to a container neck that defines an opening to the interior of a container.

In another preferred form of the invention, the dispensing end structure, into which the valve is molded, is incorporated as a unitary part of a preform which can be subsequently formed into an open-ended body of a container that can be subsequently filled with product and sealed closed. Alternatively, the end structure can be injection-molded so as to initially include a unitary open-ended container body to which the valve is molded and which is subsequently filled and sealed at the bottom end. The end structure can also be a small tube to which the valve is molded and which can be subsequently molded to a larger size.

According to another aspect of the invention, a novel method is provided for making the dispensing system. The method includes providing a first material in the form of a dispensing structure that defines a dispensing orifice and a surrounding attachment region. The method includes the step of subsequently molding a dispensing valve from a second material to include (1) a peripheral portion molded against, and bonded to, the end structure attachment region, and (2) a central portion that extends from the peripheral portion across the dispensing orifice.

The method preferably also includes the molding of a secondary sealing lid for covering the valve in a closed position and for being moved away from the closed position to permit the dispensing of the container-stored contents out of the valve. In a preferred embodiment, the dispensing end structure and a lid are molded together as a unitary structure with a hinge connecting the lid to the body to accommodate movement between the closed position and the open position.

In one preferred form of the method, the dispensing end structure is injection-molded in the form of a closure having an annular skirt that can be attached to a container neck that defines an opening to the interior of the container.

In another preferred form of the invention, the dispensing end structure is injection-molded as a unitary part of the open-ended body of a container to which the valve can be molded and which can be subsequently filled with product and sealed closed. Alternatively, the dispensing end structure can include a molded, small tube to which the valve is molded and which can then be subsequently blow-molded through the valve to form a larger size container body having a closed bottom end. The larger container can then be filled through the valve. Alternatively, the closed bottom end could be cut off, the container filled through the open bottom end, and the bottom end resealed closed.

The dispensing end structure can also be molded in the form of a preform having an annular mass of first material connected with the attachment region to which the valve is to be bonded. The annular mass is then formed into an open-ended body of a container which can be subsequently filled with product and sealed closed. This forming step can include axially stretching the annular mass to form a hollow, cylindrical wall defining the container body.

Alternatively, a first material can be formed into the open-ended body of the container by blow molding or vacuum forming. In one such process, the dispensing end structure can be provided in the form of a plastic sheet defining the dispensing orifice and valve attachment region. The valve is then molded onto the sheet attachment region. Then the sheet is formed into the open-ended body of the container or into a formed, filled, and sealed container.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

DESCRIPTION OF THE PREFERRED EMBODIMENTS

While this invention is susceptible of embodiment in many different forms, this specification and the accompanying drawings disclose only some specific forms as examples of the invention. The invention is not intended to be limited to the embodiments so described, and the scope of the invention will be pointed out in the appended claims.

For ease of description, the dispensing system components of this invention are described in various positions, and terms such as upper, lower, horizontal, etc., are used with reference to these positions. It will be understood, however, that the components may be manufactured and stored in orientations other than the ones described.

Figure 3:
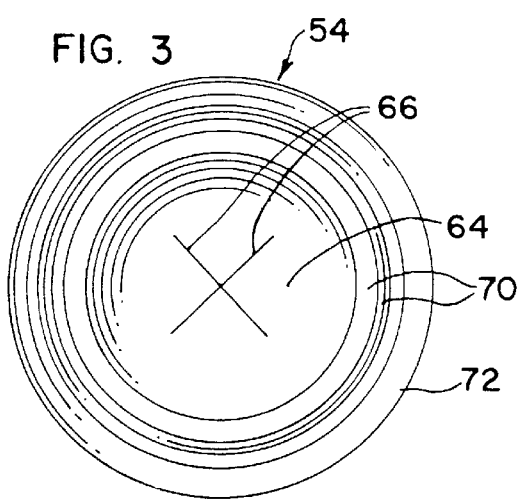
FIG. 3 is a top plan view of the valve shown in FIG. 2.
Figure 4:
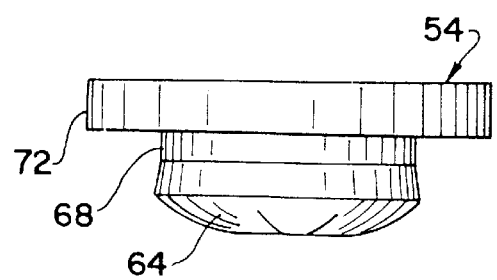
FIG. 4 is a side elevational view of the valve shown in FIG. 2.
Figure 5:
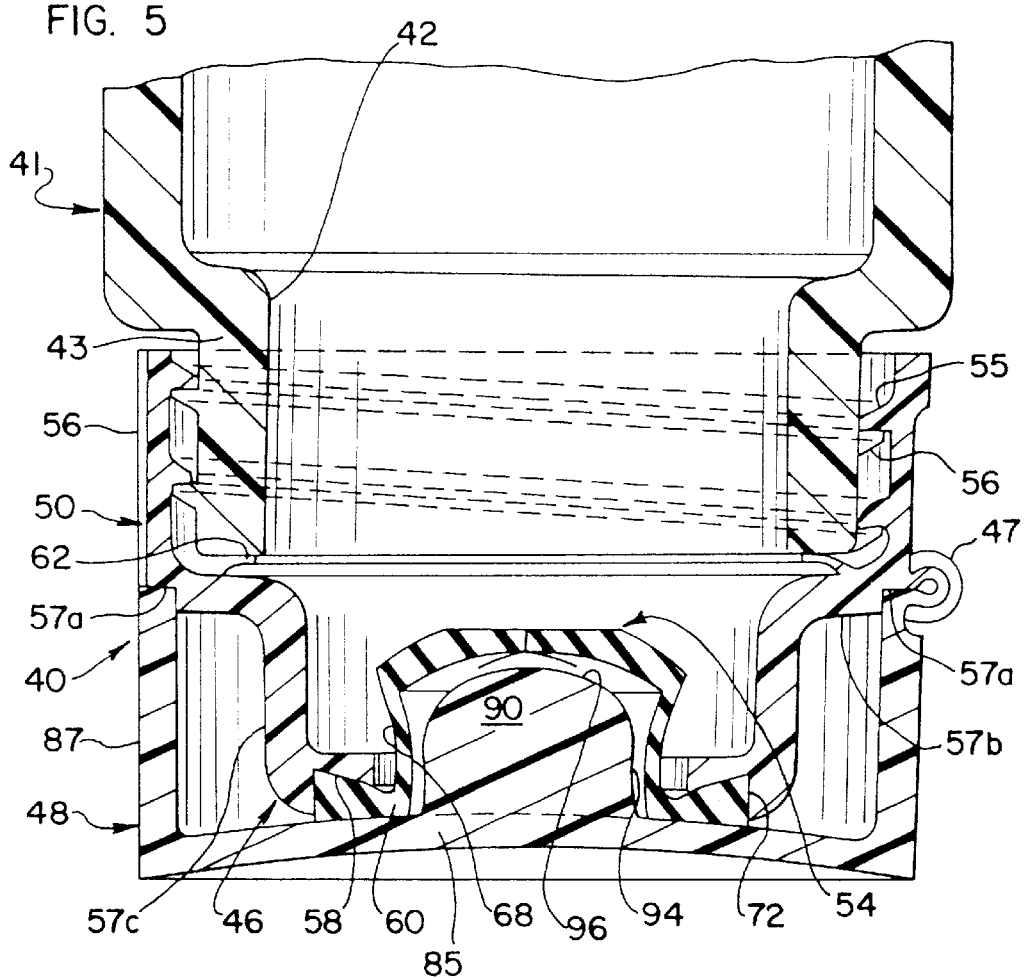
FIG. 5 is an enlarged, fragmentary, cross-sectional view of the closure shown in FIG. 1 with the lid closed and with the closure installed in an inverted orientation on a container.

With reference to the figures, a first embodiment of a dispensing system of the present invention is illustrated in FIGS. 1–8 and is represented generally in those figures by reference numeral 40. The first embodiment of the dispensing system is provided in the form of a closure 40 which is adapted to be mounted on a container 41 (FIG. 5). The container 41 has a conventional mouth or opening 42 formed by a neck 43 or other suitable structure. The neck 43 typically has (but need not have) a circular cross-sectional configuration, and the body of the container may have another cross-sectional configuration, such as an oval cross-sectional shape, for example.

The container 41 may typically be a squeezable container having a flexible wall or walls which can be grasped by the user and compressed to increase the internal pressure within the container so as to squeeze the product out of the container through the closure when opened. The container wall typically has sufficient, inherent resiliency so that when the squeezing forces are removed, the container wall returns to its normal, unstressed shape. Such a structure is preferred in many applications, but may not be necessary or preferred in other applications.

The closure 40 includes a base 46 and preferably includes a lid 48 connected to the base 46 with a hinge 47. Preferably, the hinge 47 is a snap-action hinge formed integrally with the lid 48 and base 46 in a unitary structure. The illustrated snap-action hinge 47 is a conventional type described in U.S. Pat. No. 4,403,712. Other hinge structures may be employed, including a "floppy" living film hinge. However, it is preferable to employ a snap-action hinge so as to be able to readily maintain the hinge 48 in the open position during an application of the container contents at the application site.

The base 46 is preferably injection-molded from two different materials, such as thermoplastic or thermosetting materials compatible with the container contents. The base 46 is an integral structure which includes a body or end structure 50 molded from a first material and a pressure-openable dispensing valve 54 molded from a second material. The valve 54 is bonded to the closure body or end structure 50 to form a one-piece dispensing system. No separate snap-fit retaining ring is required.

In the first embodiment illustrated in FIGS. 1–8, the body 50 includes an annular skirt or wall 56 which may have suitable connecting means (e.g., a conventional thread 55 (FIG. 5) or conventional snap-fit bead (not illustrated)) for engaging a suitable container cooperating means, such as a thread 56 on the container neck 43 (or bead, not shown) to secure the closure base 46 to the container 41. The closure base body 50 and container 41 could also be fixed together by induction melting, ultrasonic melting, gluing, or the like.

Near the top of the annular wall 56, the closure body 50 has a deck comprising a first, most outwardly, annular shoulder 57a and a second, somewhat higher annular shoulder 57b. A spout 57c projects from the shoulder 57b. The inner radius of the spout 57c terminates in an annular attachment surface or seating surface 58 around a discharge aperture or orifice 60 over the container neck opening 42. The annular surface 58 is preferably inclined at an oblique angle relative to the longitudinal axis of the orifice 60.

Preferably, an annular, flexible "crab's claw" shape seal 62 (FIGS. 5 and 7) projects from the deck shoulder 57b and is received against the upper edge of the container neck 43 adjacent the container neck opening 42 so as to provide a leak-tight seal between the closure base 46 and the container neck 43. Of course, other types of closure base/container seals may be employed. Also, if air-tightness is not required, no closure base/container seal 62 need be employed.

The container 41 and closure 40 may be normally stored in the upright orientation wherein the closure 40 is at the top of the container. The closure lid may be either closed or open. The container 41 and closure 40 may also be stored in an inverted position while the lid is either open or closed. When stored in the inverted position, the closure 40 (with the lid 48 closed or open) functions as a support base.

Figure 2:
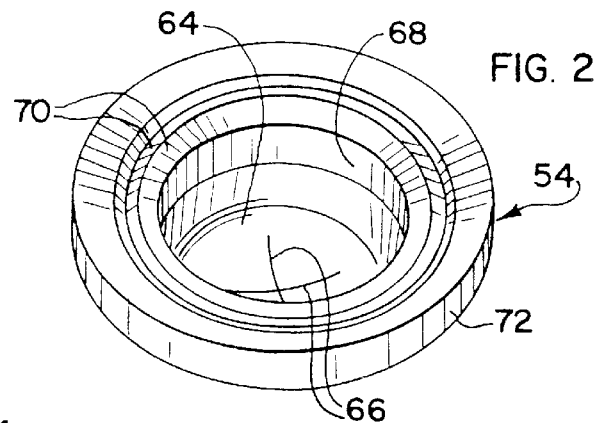
FIG. 2 is a perspective view of a pressure-openable, slit-type valve prior to installation in the closure illustrated in FIG. 1.

The preferred form of the valve 54 is illustrated FIGS. 2–4. The valve 54 is of a known design employing a flexible, resilient material which can open to dispense product. The valve 54 may be molded from thermosetting elastomeric materials, such as natural rubber and the like. Preferably, however, the valve 54 is molded from thermoplastic elastomers based upon materials such as thermoplastic propylene, ethylene, urethane, and styrene, including their halogenated counterparts.

A valve which is similar to, and functionally analogous to, valve 54 is disclosed in the U.S. Pat. No. 5,439,143. However, the preferred form of the valve 54 employed in the present invention has a peripheral flange structure (described in detail hereinafter) which differs from the flange structure of the valve shown in the U.S. Pat. No. 5,439,143. The description of the valve disclosed in the U.S. Pat. No. 5,439,143 is incorporated herein by reference to the extent pertinent and to the extent not inconsistent herewith.

As illustrated in FIGS. 3–4, the valve 54 includes a flexible, central portion, wall, or face 64 which has a concave configuration (when viewed from the exterior) and which defines at least one, and preferably two, dispensing slits 66 extending through the central wall or face 64. A preferred form of the valve 54 has two, mutually perpendicular, intersecting slits 66 of equal length. The intersecting slits 66 define four, generally sector-shaped, flaps or petals in the concave, central wall 64. The flaps open outwardly from the intersection point of the slits 66 in response to increasing container pressure of sufficient magnitude in the well-known manner described in the U.S. Pat. No. 5,439,143.

The valve 54 includes a skirt 68 (FIG. 4) which extends outwardly from the valve central wall or face 64. At the outer (upper) end of the skirt 68 there is a thin, annular flange 70 which extends peripherally from the skirt 68 in an angled orientation. The thin flange 70 terminates in an enlarged, much thicker, peripheral flange 72 which has a generally dovetail shaped transverse cross section.

To accommodate the seating of the valve 54 in the closure 40, the attachment region or surface 58 of the closure body 50 has the same mating angle as the angle of the valve flange dovetail configuration. The bottom surface of the valve flange 72 is disposed on, and bonded to, the closure body attachment region or surface 58.

Figure 1:
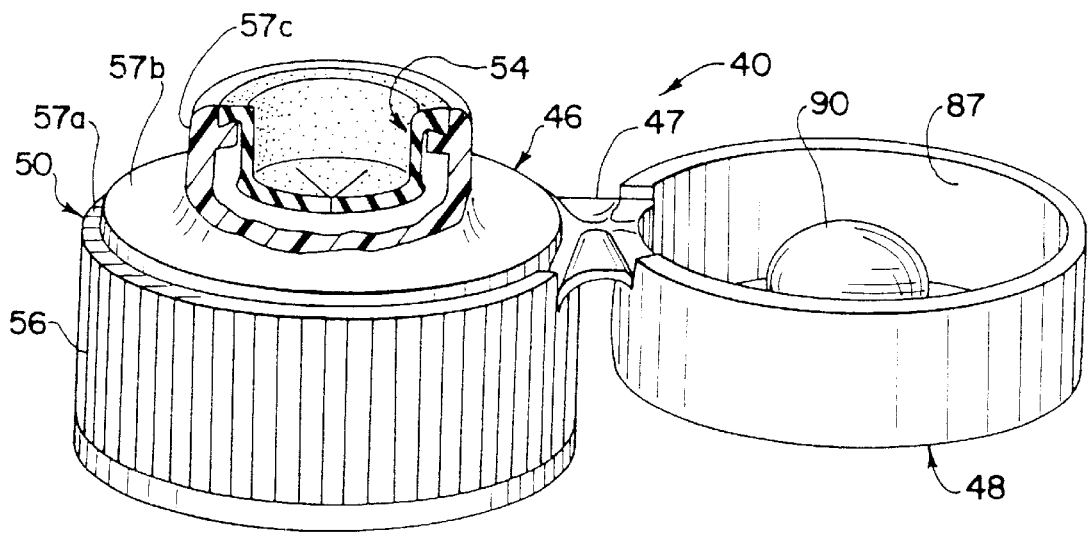
FIG. 1 is a perspective view of a first embodiment of a dispensing system of the present invention shown incorporated in a closure with an open lid.
Figure 6:
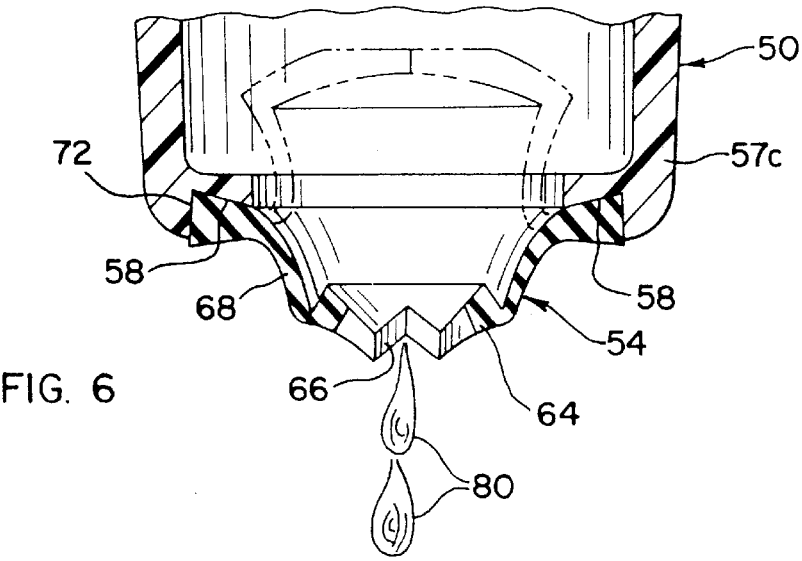
FIG. 6 is a view similar to FIG. 5, but FIG. 6 is fragmentary view of FIG. 5 showing the closure with the lid open and with the container being squeezed to open the valve for discharging product from the container.
Figure 7:
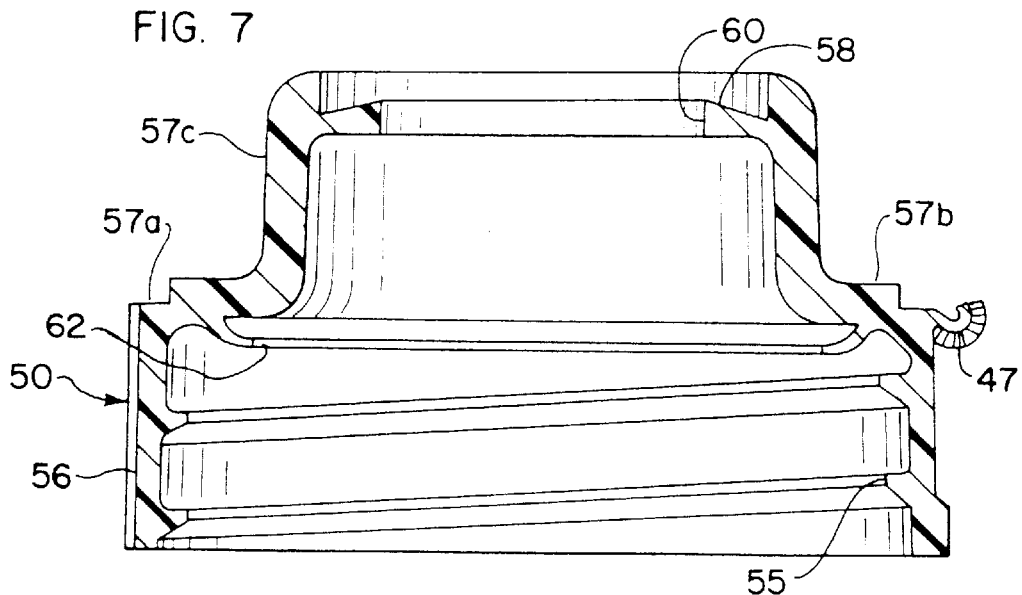
FIG. 7 is a fragmentary, cross-sectional view of the body of the closure illustrated in FIG. 1.
Figure 8:
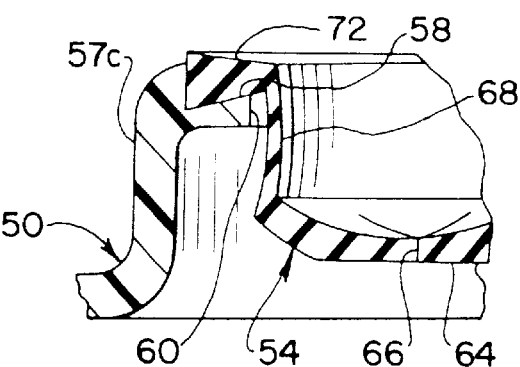
FIG. 8 is a fragmentary, cross-sectional view similar to FIG. 7, but FIG. 8 shows the valve molded onto the closure body.

When the valve 54 is properly mounted within the closure 40 as illustrated in FIGS. 1 and 5, the central wall or face 64 of the valve 54 lies recessed within the closure body dispensing orifice 60. However, when the lid 48 is open (FIGS. 1 and 6) and the container 41 is squeezed to dispense the contents through the valve 54 (as described in detail in the U.S. Pat. No. 5,439,143), then the valve central wall or face 64 is forced outwardly from its recessed position toward the upper end of the dispensing passage or orifice 60 (FIG. 6).

In use, the container lid 48 is opened, and the container 41 is typically inverted and squeezed to increase the pressure within the container above ambient. This forces the product within the container toward the valve 54 and forces the valve 54 from the recessed or retracted position (illustrated in FIGS. 1 and 5) toward the outwardly extending position. The outward displacement of the concave, central wall or face 64 is accommodated by the relatively, thin, flexible, skirt 68. The skirt 68 moves from an inwardly projecting, rest position to the pressurized position wherein the skirt 68 rolls outwardly toward the outside of the closure body 50. However, the valve 54 does not open (i.e., the slits 66 do not open) until the valve central wall or face 64 has moved substantially all the way to a fully extended position adjacent or beyond the dispensing passage 60. Indeed, as the valve central wall 64 moves outwardly, the valve central wall 64 is subjected to radially inwardly directed compression forces which tend to further resist opening of the slits 66. Further, the valve central wall 64 generally retains its outwardly concave configuration as it moves outwardly and even after it reaches the fully extended position. However, when the internal pressure becomes sufficiently high, then the slits 66 of the valve 54 begin to open to dispense product (FIG. 6). The product is then expelled or discharged through the open slits 66. For illustrative purposes, FIG. 6 shows drops 80 of liquid product being discharged.

The lid 48 includes a concave, top wall 85 (FIG. 5) and an outer skirt or wall 87. As illustrated in FIG. 5, the lid outer wall 87 is adapted to seat on the annular shoulder 57*a* defined at the top of the closure base body sidewall 56.

The lid 48 includes a novel structure for preventing discharge of the container product through the valve 54 when the lid is closed and the container is inadvertently squeezed or subjected impact forces which would increase the pressure within the container. In particular, a spud or seal post 90 (FIG. 5) projects inwardly from the lid central panel 85. The post 90 includes a generally cylindrical portion having an external, cylindrical surface 94. In the embodiment illustrated, the seal post 90 is formed as a solid structure, but it could be formed as a hollow recess in the lid central panel 85.

The post 90 terminates in an outwardly convex distal end surface 96 that substantially conforms to the concave configuration of the outer surface of the valve central wall 64. However, when the lid 48 is closed, the post distal end surface 96 is spaced outwardly from the valve central wall 64 (FIG. 5) by an amount which accommodates an initial, small outward displacement of the valve central wall 64 into engagement with the post distal end surface 96 before the valve slits 66 open. Thus, when the closed container is subjected to external forces which increase the container internal pressure, the valve central wall 64 is forced outwardly against the conforming surface 96 of the seal post 90. This occurs inwardly of the outermost position at which the valve slits 66 would open. Thus, the valve 54 remains sealed closed in such over-pressure situations.

Further, it will be appreciated that as the valve central wall 64 moves outwardly, the valve skirt 68 is carried upwardly around the seal post 90. Preferably, the external diameter of the seal post 90 is less than the internal diameter of the valve skirt 68, but the seal post external diameter is sufficiently large so that the valve skirt 68 can seal against an annular portion of the seal post cylindrical surface 94 during over-pressure conditions when the valve is forced outwardly.

In a contemplated embodiment, as the valve 54 articulates or moves outwardly from the fully recessed position illustrated in FIG. 5 to a more outwardly position (intermediate the positions shown in FIGS. 5 and 6), the periphery of the valve central wall 64 and portion of the skirt 68 may tend to be compressed slightly in the radially inwardly direction to accommodate the movement of the valve. The slight reduction in the diameters of portions of the valve may be characterized as somewhat of a "collapsing" motion which occurs around the seal post 90 and which facilitates the sealing of the valve 54 by the seal post 90. The sealing engagement between the seal post distal end surface 96 and the valve central wall 64, as well as between the seal post cylindrical surface 94 and the adjacent valve skirt 68, serves to provide a highly effective seal which prevents unwanted dispensing of product into the lid region of the closure.

Preferably, the lid seal post 90 is smooth and free of indentations or other structure which could collect unwanted product, and the smooth surface of the seal post 90 provides a highly effective sealing surface for engagement with the valve 54. In other contemplated embodiments, there need not be sealing around the seal post cylindrical surface 94 so long as the valve wall 64 engages the post end surface 96 before the slits start to open.

The outward movement of the valve central wall 64 from the recessed position (FIG. 5) to the more outwardly position against the seal post 90 temporarily increases the internal volume of the system. This volume increase can reduce the rate of pressure increase or peak pressure, and this can help accommodate the over-pressure condition resulting from external impact forces during shipping or handling.

Another, somewhat similar valve sealing structure incorporated in a lid is disclosed in U.S. Pat. No. 5,213,236. This may be preferable in some applications.

In a preferred embodiment, the closure base body 50, lid 48, and hinge 47 are molded from a first material, such as polypropylene, and the valve 54 is molded from a second material, such as a thermoplastic elastomer.

According to one technique, a multi-shot injection molding process is used to first mold the closure base body or end structure 50 as a "preform" in a first injection phase in a mold. This includes the optional lid 48 and hinge 47 in the preferred embodiment illustrated. The preform is then transferred to a second, differently shaped cavity generally within the same mold wherein the second material (e.g., thermoplastic elastomer) is injection-molded (over-molded) in a second phase onto and against the annular attachment surface 58 of the closure preform to form the valve 54. The valve 54 is preferably attached or bonded to the closure base body 50 by the creation of a weld defined by the interface solidification of melted portions of the first and/or second materials. The valve 54 may be molded with the slits 66. However, in a presently preferred method, the valve slits 66 are cut into the wall or face 64 by suitable conventional or special techniques.

Descriptions of multi-shot, multi-material injection molding techniques are set forth in "Multi-Material Injection Saves Time, While Cutting Costs," MODERN PLASTICS, Mar. 19, 1994 (author: Peter Mapleston), in "Molding Many Parts Into One," Product Design and Development, Dec. 19, 1995, page 16 (author: Jay Rosenberg), and in U.S. Pat. No. 5,439,124.

The above-described molding technique need not be employed. Other techniques may be used. For example, according to a preferred method for making the closure, the body, lid, and hinge can be initially molded from a first material in a mold assembly pursuant to the process for molding a body, lid, and hinge disclosed in the European Patent No. 0 570 276. Subsequently, the valve 54 can be molded from a second material against the closure body surface 58 in the same mold assembly after repositioning an internal mold element. The European Patent No. 0 570 276 discloses how an internal mold element 12 can be repositioned to accommodate the molding of a second material into a ring 8 against the closure body. This technique can be employed according to the present invention for molding the valve 54 in a mold assembly against the previously molded closure body. The description of the method and apparatus disclosed in the European Patent No. 0 570 276 is incorporated herein by reference thereto to the extent pertinent and to the extent non inconsistent herewith.

The use of a thermoplastic elastomer for injection molding the valve 54 is in many applications because a thermoplastic elastomer provides suitable characteristics which accommodate the desired opening and closing of the valve 54 in response to the container interior pressure changes.

A closure lid, such as the lid 48, need not be provided. If provided, the closure lid 48 may be an entirely separate piece unconnected to the closure base 46. Preferably, however, the hinge 47 is provided for connecting the lid 48 to the body base 46 to form a unitary structure. The hinge may be a floppy hinge or a snap-action hinge, but a snap-action hinge 47 is preferred.

When the user desires to dispense product from the container through the closure 40, the user lifts the lid 48 away from the valve 54. When the lid 48 is moved far enough away from the valve 54, the product may be discharged from the container through the valve 54 by squeezing the container as previously described in detail. When it is again desired to seal the container closed, the lid 48 is moved back onto the base body 50. In some packages, the lid 48 can be designed to be left open.

Because the valve 54 is bonded to the closure body 50, the closure may be characterized as a one-piece system or integral system. Because the valve 54 is molded directly into the closure body 50, separate manufacture, storage, and handling of the valve 54 is not required. Costly manufacturing processes for assembling a small valve into a closure body are eliminated. The one-piece system eliminates or minimizes potential defects arising from improper assembly. The one-piece dispensing system is less likely to leak or become loose.

Figure 9:
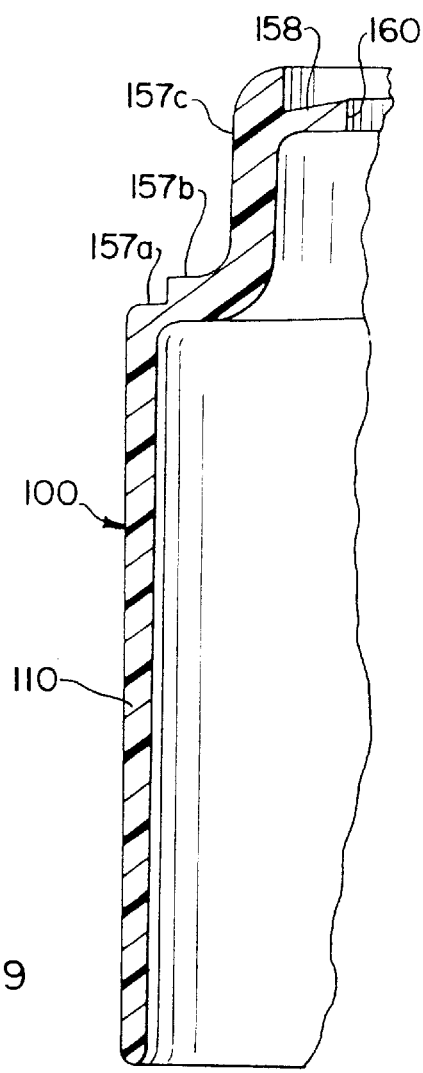
FIG. 9 is a fragmentary, cross-sectional view of an alternate embodiment of the dispensing system of the present invention.
Figure 10:
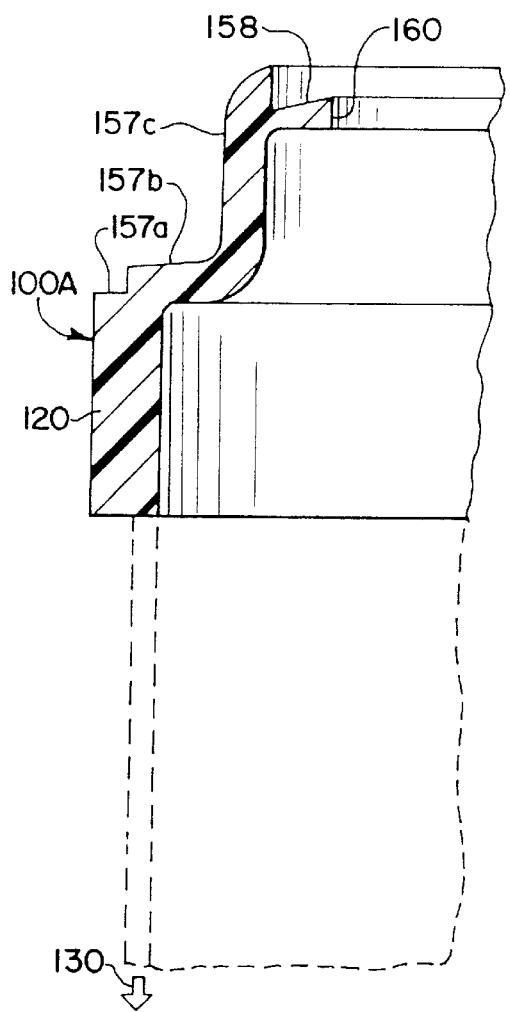
FIG. 10 is a fragmentary, cross-sectional view of a precursor structure or preform employed in the manufacture of another alternate embodiment of the dispensing system of the present invention.
Figure 11:
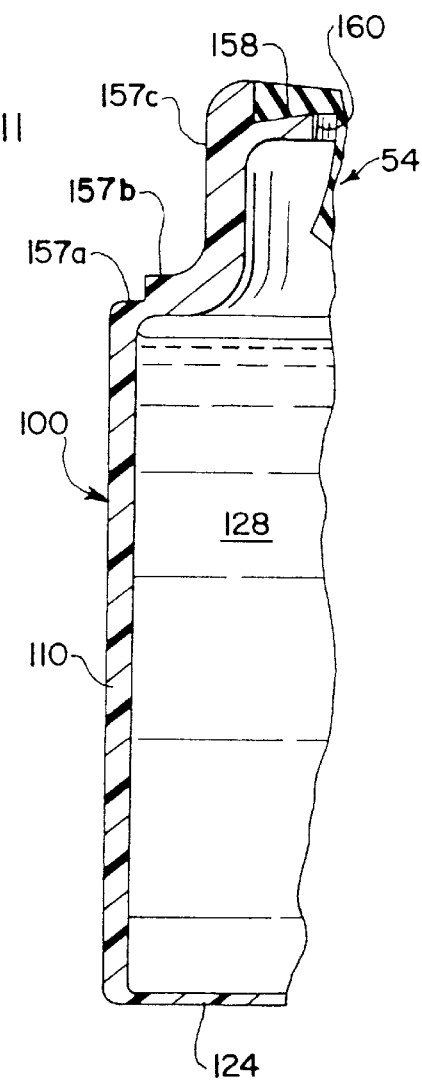
FIG. 11 is a view similar to FIG. 9, but FIG. 11 shows the bottom sealed closed across the container bottom, the valve molded in place, and product within the container.

Alternate embodiments of the dispensing system of the present invention are illustrated in FIGS. 9, 10, and 11. In these other embodiments, the dispensing system is provided directly in a container body rather than in a separate closure mounted to a container body. Elimination of the separate dispensing closure reduces the number of components of the package and provides a more secure package. Because there is no separate dispensing closure mounted to the container, easy access to the container interior is eliminated. Further, elimination of a separate closure per se avoids manufacturing problems associated with storing, handling, and assembling a separate closure on a separate container. Further, potential loose fit or leakage problems associated with separate closures are eliminated.

The alternate embodiments of the dispensing system may be characterized as including, among others, any of the following: (1) a dispensing end structure in the form of an open-ended container body 100 (FIG. 9) with a dispensing valve bonded to the container body, (2) a dispensing end structure in the form of a preform 100A (FIG. 10) which has a dispensing valve bonded thereto and which can be subsequently formed into an open-ended container body, or (3) a dispensing end structure in the form of a small preform tube or body with a dispensing valve bonded to it and with can be subsequently blow-molded to form a larger, bottom-sealed container (FIG. 11). The dispensing valve may be any suitable dispensing valve, such as the dispensing valve 54 described above with reference to the first embodiment illustrated in FIGS. 1–6.

In the alternate embodiments, the dispensing end structure 100 may be directly injection-molded as an open-ended container body illustrated in FIG. 9. The dispensing end structure may also be created by first molding a preform 100A (shown in solid lines in FIG. 10) to which the valve can be molded and which is subsequently stretched or formed into the open-ended container body (shown in dashed lines in FIG. 10). The dispensing end structure may also be created by first molding a small tube preform to which the valve can be molded and which is subsequently blow-molded to form a larger size container. In any case, the dispensing end structure (e.g., 100 or 100A) has a valve attachment surface 158 surrounding a dispensing orifice 160. Preferably, the dispensing end structure has a peripheral shoulder 157a, a deck 157b, and an annular spout 157c projecting upwardly from the deck 157b. The spout 157c defines the valve attachment region or surface 158 and the dispensing orifice 160.

Preferably, the attachment region surface 158 is defined on an annular shoulder and is oriented at an oblique angle to the longitudinal axis of the dispensing orifice 160. The attachment region surface 158 is preferably oriented at an angle to match the angle of the surface of the valve flange (e.g., flange 72 of the valve 54 which is fully illustrated FIGS. 2–4). Other suitable types of valves and flange arrangements may be employed. For example, the bottom seating surface of the valve flange 72 may be generally planar instead of angled, and the attachment surface 158 may be planar, rather than angled.

According to one form of the invention, the dispensing end structure 100 is injection-molded from a first material (e.g., polypropylene) to initially include (1) the above-described valve mounting configuration (e.g., shoulder 157a, deck 157b, spout 157c, attachment surface 158, and dispensing orifice 160), and (2) an open-ended container body portion having a hollow, cylindrical wall 110 (FIG. 9). Subsequently, the valve (such as the valve 54 which is fully illustrated in FIGS. 2–4) can be injection-molded onto the attachment region surface 158 (in the same manner as previously described with respect to molding the valve 54 onto the first embodiment closure body attachment surface 58 illustrated in FIGS. 7 and 8).

Preferably, a multi-shot injection molding process is used to make the system which includes the dispensing end structure 100 shown in FIG. 9. In a first phase, the dispensing end structure 100 (which contains the container body wall 110) is injection-molded in a mold from a first material (e.g., polypropylene). The structure 100 may be transferred to a second, differently shaped cavity generally within the same mold wherein a second material (e.g., a thermoplastic elastomer) is injection-molded (over molded) in a second phase onto and against the attachment surface 158 of the dispensing end structure so as to form the valve (e.g., valve 54 shown in FIGS. 2–4). Preferably, the structure 100 and valve 54 are molded from two different materials pursuant to the technique taught in the European Patent No. 0 570 276 wherein a movable internal mold element is employed. The mold element is repositioned after the body is molded to accommodate molding of the valve. The valve is preferably bonded to the dispensing end structure surface 158 by the creation of a weld defined by the interface solidification of melted portions of the first and/or second materials.

The open-ended structure 100 can then be provided to the product packager for filling and sealing. That is, the packager can fill the interior of the container body wall 110 with product through the open end (opposite the end at which the valve is located). The open end of the container body wall 110 can then be sealed closed by a suitable conventional or special process. FIG. 11 shows the completed package with sealed closed bottom end 124, closed on the top with 54, and filled with a liquid product 128.

In another form of the invention, a dispensing end structure may be initially molded as a preform 100A in the first injection phase as shown in solid lines in FIG. 10 so as to have a thicker, short wall or annular mass 120 of the first material extending from the deck 157b. Owing to the unitary, injection-molded nature of the preform 100A, the annular mass or wall 120 may be characterized as being connected to the attachment region 158 (through the deck 157b and spout 157c). After the dispensing end structure or preform 100A is injection-molded, the valve (such as valve 54) is molded onto the dispensing end structure attachment surface 158 to form the dispensing system.

Subsequently, the dispensing system (i.e., end structure preform 100A with the valve bonded thereto) is transferred to a secondary processing system wherein the annular mass or wall 120 is subsequently stretched axially along its length to create the open-ended container body having an annular wall 110 as shown in dashed lines in FIG. 10. The valve is not shown in FIG. 10 for ease of illustration, but it is to be understood that the valve would have been molded in place to form the dispensing system prior to the wall 120 being stretched. This stretching process is illustrated in FIG. 10 by the arrow 130 which represents the application of a tensile stretching force to the structure to form the wall 110. Any suitable stretching process or body-forming process may be employed. One process for making a unitary, open-ended container body having a dispensing end is disclosed in the international patent application PCT/EP95/01395 (Publication WO 95/28274).

According to yet another contemplated aspect of the present invention, the dispensing end structure can be made by initially injection-molding a preform that includes a small diameter tube or container body with an open bottom end. Then, the valve (e.g., valve 54) is molded into the dispensing orifice (pursuant to the techniques discussed above in describing the first embodiment) to create the dispensing system. The open-ended dispensing system (i.e., the small diameter tube or container body preform with the slit valve in place) can then be blow molded to a larger, final configuration. To do this, the open, bottom end of the smaller preform would be clamped and sealed off by the closed, blow mold halves during the blow-molding process. The tube or body can be pressurized and blown by inserting and sealing off the blow pin through the valve slits (or alternatively by sealing the end of the blow pin against the valve flange 70. The tube or body is blow-molded to a larger size and final configuration so that the first material creates a closed bottom end opposite the top valve end. Following trimming of the flash on the sealed closed bottom end, the resulting molded product is then provided to the packager for filling through the valve. Alternatively, the closed bottom end could cut off, and the body could then be filled through the open bottom end which could be subsequently sealed closed.

In yet another form of the present invention, the dispensing end structure may be initially provided in the form of a sheet of thermoplastic material defining a dispensing orifice and valve attachment region. The valve is then molded directly onto the sheet of thermoplastic material against the attachment region. The sheet is subsequently subjected to a secondary forming operation, such as vacuum forming, so as to form the open-ended container body which can then be filled with product and sealed closed by the packager. Alternatively, the sheet could be formed, filled, and bottom-sealed in a pouch sealing type of operation prior to molding the valve to the container.

The above-described injection-molding process, wall stretching process, blow-molding process, vacuum-forming process, and pouch-sealing process may employ conventional or special techniques. The details of such techniques form no part of the present invention.

Although FIGS. 9 and 10 do not show a lid, it will be appreciated that the dispensing end structure may be molded with or without a lid.

It will be readily observed from the foregoing detailed description of the invention and from the illustrations thereof that numerous other variations and modifications may be effected without departing from the true spirit and scope of the novel concepts or principles of this invention.

What is claimed is:

1. A dispensing system for a container, said system comprising:

a dispensing end structure molded from a first material to define a dispensing orifice and a surrounding outwardly facing attachment surface which is recessed relative to an adjacent exterior surface portion of said first material of said dispensing end structure; and a dispensing valve molded from a second material and including
   (a) a flexible central portion having a normally closed dispensing aperture which opens to permit flow therethrough in response to increased pressure on one side of said valve,
   (b) a skirt extending from said flexible central portion, and
   (c) a peripheral portion which (1) has an increased thickness relative to said skirt, (2) is joined to said skirt in a unitary manner, and (3) has a configuration wherein at least part of said peripheral portion has a generally diverging shape transverse cross section, at least part of said peripheral portion having been molded against said body attachment surface in surface-to-surface contact to create a bond between said peripheral portion and said body attachment surface securing said valve on said dispensing end structure so that both said valve flexible central portion and at least a major portion of said valve skirt are located inwardly of said exterior surface portion of said dispensing end structure and so that said valve peripheral portion has an exposed exterior surface free of an overlying clamping attachment structure when a lid, if any, is open.

2. The system in accordance with claim 1 further including a lid molded as a unitary part of said end structure for occluding said dispensing orifice in a closed position over said end structure and for being moved away from said closed position to permit the dispensing of a product out of said valve.

3. The system in accordance with claim 1 in which said end structure consists only of said first material;

said valve consists only of said second material; and said valve peripheral portion is attached to said end structure with a weld defined by the interface solidification of melted portions of said first and second materials.

4. The system in accordance with claim 1 in which said first material is polypropylene and said second material is a thermoplastic elastomer.

5. The system in accordance with claim 1 in which said end structure is an injection-molded closure body having an annular skirt that is releasably attachable to a container neck that defines an opening to the interior of a container.

6. The system in accordance with claim 1 in which said valve is molded from a thermoplastic elastomer; and said valve central portion has a dispensing aperture defined by two intersecting slits which open to permit flow therethrough in response to increased pressure on one side of said valve and which close to shut off flow therethrough upon removal of the increased pressure.

7. The system in accordance with claim 1 in which said end structure includes an annular mass of said first material which is connected to said attachment surface and which can be formed into an open-ended container body that can be subsequently filled with product and sealed closed.

8. The system in accordance with claim 1 in which said end structure includes an injection-molded, open-ended body of a container having a hollow, cylindrical wall which can be subsequently filled with product and sealed closed.

9. The system in accordance with claim 1 in which said end structure includes a small tube which (1) defines said dispensing orifice and surrounding attachment surface to which said valve is bonded, (2) has an open end opposite said valve, and (3) can be subsequently blow-molded to a larger size container with a sealed closed end opposite said valve.

10. The dispensing system in accordance with claim 1 in which said peripheral portion has a peripheral cylindrical surface, and in which said generally diverging shape transverse cross section is a dovetail shape extending all the way to said peripheral cylindrical surface.

* * * * *